(12) United States Patent
Cui et al.

(10) Patent No.: US 7,473,837 B2
(45) Date of Patent: Jan. 6, 2009

(54) DEVICE AND METHOD FOR SYNCHRONIZING ILLUMINATION WITH MUSIC

(75) Inventors: Songtao Cui, Beijing (CN); Zhengjun Zhou, Beijing (CN); Jun Wang, Beijing (CN)

(73) Assignees: Vimicro International Ltd., Beijing (CN); Vimicro Corporation, Beijing (CN)

( * ) Notice: Subject to any disclaimer, the term of this patent is extended or adjusted under 35 U.S.C. 154(b) by 256 days.

(21) Appl. No.: 11/317,667

(22) Filed: Dec. 23, 2005

(65) Prior Publication Data
US 2006/0137510 A1 Jun. 29, 2006

(30) Foreign Application Priority Data

| Dec. 24, 2004 | (CN) | ........................ 2004 1 0102614 |
| Dec. 24, 2004 | (CN) | ........................ 2004 1 0102615 |
| Dec. 24, 2004 | (CN) | ........................ 2004 1 0102616 |
| Dec. 24, 2004 | (CN) | ........................ 2004 1 0102617 |

(51) Int. Cl.
*G10H 1/00* (2006.01)

(52) U.S. Cl. ...................................... 84/464 R; 84/609
(58) Field of Classification Search ................ 84/464 R, 84/454, 609
See application file for complete search history.

(56) References Cited

U.S. PATENT DOCUMENTS

| 5,070,754 | A | * | 12/1991 | Adamson ...................... 84/454 |
| 5,319,527 | A | * | 6/1994 | Murphy et al. ................ 362/26 |
| 5,952,597 | A | * | 9/1999 | Weinstock et al. ............ 84/609 |
| 6,894,212 | B2 | * | 5/2005 | Capano ....................... 84/454 |
| 7,228,190 | B2 | * | 6/2007 | Dowling et al. ............... 700/94 |

\* cited by examiner

*Primary Examiner*—Walter Benson
*Assistant Examiner*—Jianchun Qin
(74) *Attorney, Agent, or Firm*—Joe Zheng

(57) ABSTRACT

Various techniques for synchronizing illumination with an audio signal are disclosed. According to one aspect of the techniques, an audio signal is continuously received and processed one phase or period at a time in an analyzing or detecting unit. From one phase of the audio signal, a set of light controlling parameters are determined from a look-up-table. These light controlling parameters are used to adjust duty cycles of square waves used to drive a plurality of light sources such that the illumination produced is in accordance with the audio signal.

10 Claims, 7 Drawing Sheets

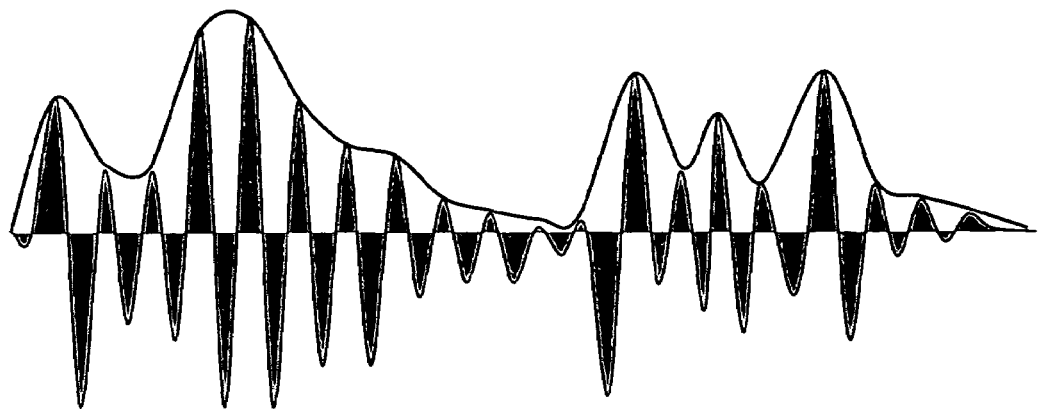
FIG. 1 *(Prior Art)*
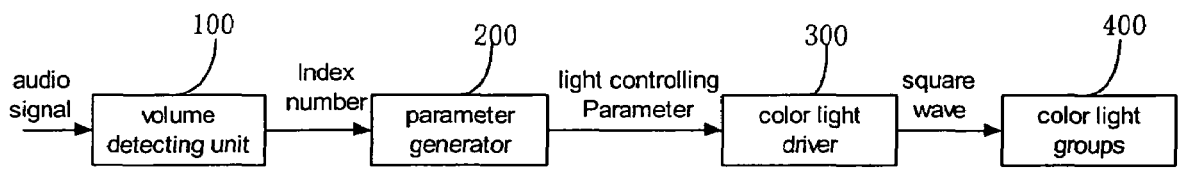
FIG. 2
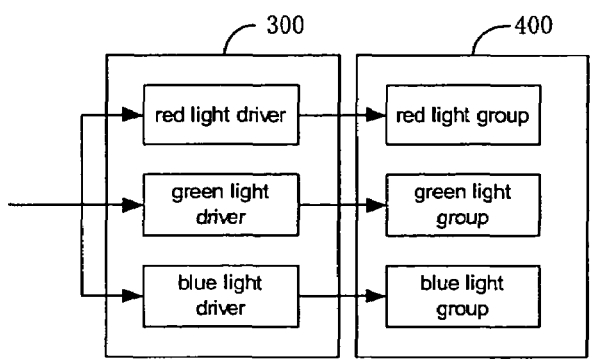
FIG. 3

DEVICE AND METHOD FOR SYNCHRONIZING ILLUMINATION WITH MUSIC

BACKGROUND OF THE INVENTION

1. Field of the Invention

The present invention relates to the area of illumination control, and more particularly related to apparatus and method for synchronizing illumination in accordance with music being played, wherein the illumination includes lights (e.g., LED or fluorescent lights) and displays (e.g., computer screen and TV displays).

2. Description of Related Art

In conventional consumer electronic products, such as mobile phone, MP3 or CD player etc., a plurality of Light-Emitting Diodes (LED) is employed to flash along with a piece of music being played to enhance visual effects. In these products, the LEDs are activated to turn off and on with the rhythm of the music. Many media players such as a DVD player or Microsoft media player, can play both audio and video media files or discs. However, when audio media is played, a display screen supporting such a media player displays either a static image or random patterns that have no any connection with the rhythm in the audio, resulting in boring visual effects.

Many audios, especially music and songs, possess rhythm including varying tones and tempos. Thus there is a need for techniques that converse the rhythm in audio being played into synchronized illumination in a display including LED lights and a display screen.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, various techniques for synchronizing illumination with an audio signal are disclosed. According to one aspect of the techniques, a method for synchronizing illumination with an audio signal comprises receiving the audio signal continuously and processing one phase of the audio signal at a time, analyzing the one phase of the audio signal to determine a set of light controlling parameters, receiving the light controlling parameters from a look-up-table, and adjusting duty cycles of square waves used to drive a plurality of light sources such that the illumination produced is in accordance with the one phase of the audio signal.

The present invention may be implemented in software and hardware, or in combination of both. The present invention may be applied to control light sources along with music. The light sources may be in form of individual lights to flash along with a piece of music being played or a display screen to display patterns in synchronization of a piece of music to enhance visual effects.

According to one embodiment, the present invention is a device for synchronizing illumination along with an audio signal, the device comprises an analyzing unit receiving the audio signal continuously and processing one phase of the audio signal at a time, the analyzing unit configured to analyze the one phase of the audio signal to determine a set of light controlling parameters, a controlling unit coupled to a bus, and a memory unit having a look-up-table to provide the light controlling parameters, wherein duty cycles of square waves used to drive a plurality of light sources are adjusted in accordance with the light controlling parameters such that the illumination produced is in accordance with the one phase of the audio signal.

One of the features, benefits and advantages in the present invention is to provide techniques for synchronizing illumination with an audio signal.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1 is an oscillogram showing a phase of an audio signal;

FIG. 2 is a block diagram showing a device for synchronizing lights along with a piece of music in one embodiment of the present invention;

FIG. 3 shows that the light groups include a red light group, a blue light group and a green light group, each color light group includes at least one red light, one green light and one blue light;

DETAILED DESCRIPTION OF THE INVENTION

Figure 4A:
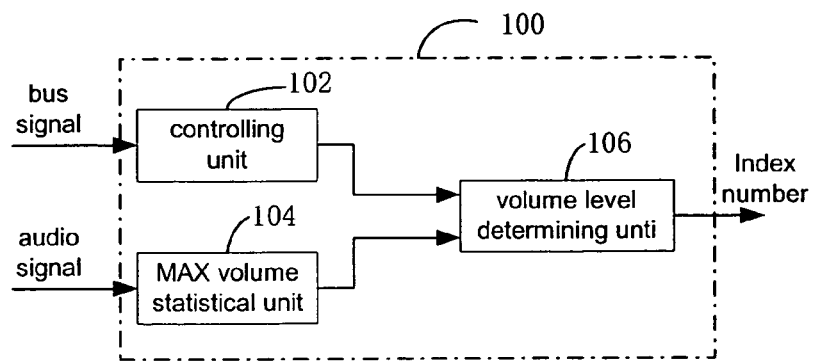
FIG. 4a and FIG. 4b show together an exemplary embodiment of a volume detecting unit.

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

To facilitate the description of the present invention, it deems necessary to introduce some fundamentals of sound and other related aspects. A sound is created when objects vibrate thus producing pressure waves that can be picked up by human ears. These pressure waves may be represented graphically by corresponding visual waveform. FIG. 1 shows a phase of waveform to represent an audio signal, where the amplitude reflects the change in pressure from a peak of the waveform to a trough, causing the volume of the sound to change. At the same time, the frequency changes together with the amplitude in the waveform cause changes that sound musical to the human hearing system.

One of the aspects of the present invention is to synchronize illumination with an audio being played. The illumination, as used herein, includes various light emitting devices. Examples of such light emitting devices include Light Emitting Diodes (LEDs), fluorescent lights, LCD. When these light emitting devices are properly arranged, a display screen is formed. Therefore, the illumination as used herein also includes various displays such as LCD or LED-based displayed.

As far as a single light is concerned, it has two statuses, ON and OFF. When the light is ON, the light shines. When the light is OFF, the light goes out. Thus, if the light is driven by a square wave with a predetermined duty ratio, the light will alternate between bright and dark. Namely, the light shines in high levels of the square waves and goes out in low levels of the square wave.

If the duty cycle T of the square waves is short enough, it is hard for human eyes to see the lighting alternation between bright and dark, instead only continuous average brightness of the light can be sensed. The average brightness value is relative to the duty cycle of the square waves. Thus, by adjusting the duty cycle of the square waves, the brightness of the lights can be controlled.

It is well known that almost any visible color can be reproduced by combining three colored components, such as Red, Green, and Blue (RGB). For example, RGB=(0,0,0) represents black while RGB=(255,255,255) represents white. Respective value changes in RGB will create other colors. According to one embodiment, the lights employed include a plurality of red, blue, green lights, for example, an equal number of red, green and blue LEDs. When these lights are grouped as individual groups or sets, each set including a red light, a green light and a blue light. Essentially all visible colors may be reproduced by the sets of LEDs through the control of power applied thereto, thus creating colorfully visual effect.

Referring now to FIG. 2, there shows a block diagram for controlling colorful illumination along with music being played, according to one embodiment of the present invention. FIG. 2 includes a volume detecting unit 100, a parameter generator 200, a color light driver 300 and a plurality of light groups 400.

FIG. 3 shows that the light groups 400 includes a red light group, a blue light group and a green light group, each color light group includes at least one red light, one green light and one blue light. The color light driver 300 includes a red light driver, a green light driver, and a blue light driver, each is configured to produce square waves to drive a corresponding color light group. By adjusting the duty cycle of the square waves, most visible color light can be reproduced.

Referring back to FIG. 2, the parameter generator 200 is for generating light controlling parameters according to which the duty cycle of the square waves can be adjusted. In one embodiment, a lookup table is provided in a register, a RAM or a ROM in the parameter generator 200. When an index number is inputted into the look up table, the light controlling parameters corresponding to the index number will be outputted by looking up the lookup table.

The volume detecting unit 100 is provided to capture the audio signal and analyze the volume thereof. According to the volume of the audio signal and variation of the volume, a corresponding index number is produced and coupled to the lookup table in the parameter generator 200. As a result, the color light groups can be controlled to illuminate along with the audio signal.

Depending on implementation, the volume detecting unit 100 may be implemented in many forms in the present invention. In one embodiment as shown in FIG. 4a, there are a controlling unit 102, a maximum (MAX) volume statistical unit 104 and a volume level determining unit 106. The MAX volume statistical unit 104 is provided to capture a phase of an audio signal and compute the MAX volume of the audio signal. The controlling unit 102 is to provide a timing clock and volume level parameters according to which the volume levels can be partitioned.

The volume level determining unit 106 coupled to the controlling unit 102 and the MAX volume statistical unit 104 is provided to determine which volume level the MAX volume of the audio signal corresponds to, according to the determined volume level, and produce a corresponding index number for the lookup table.

Figure 4B:
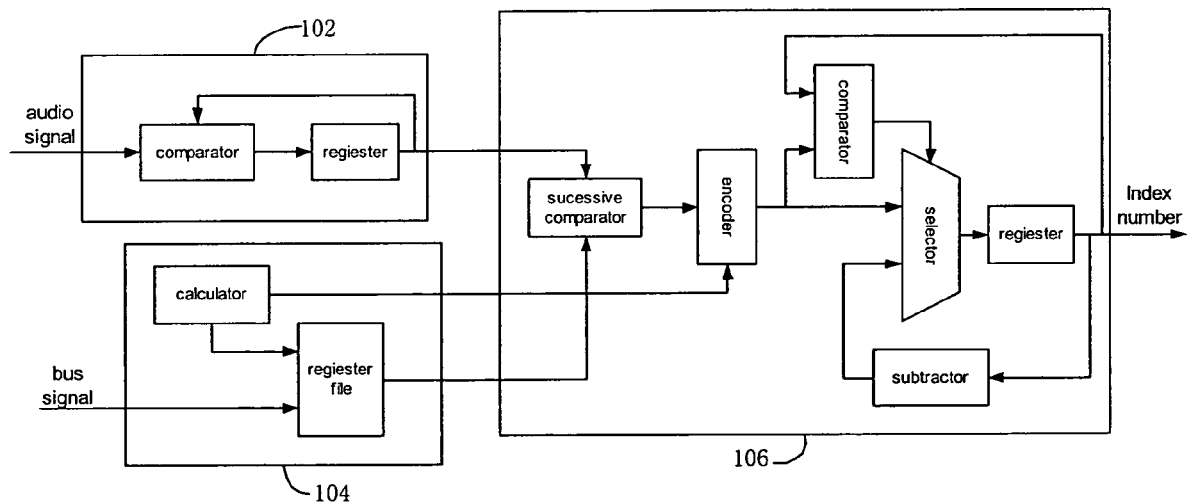

Referring to FIG. 4b, there shows an exemplary detailed block diagram in accordance with FIG. 4a. The MAX volume statistical unit 104 includes a comparator which captures a phase of the audio signal and computes the MAX volume of the audio signal and a register that the MAX volume of the phase audio signal is reserved therein. The controlling unit 102 includes a calculator producing the timing clock and a file register receiving and reserving the volume level parameters from a bus, and coupling them to the volume level determining unit 106.

As shown in the figure, the volume level determining unit 106 includes a successive comparator, an encoder, a comparator, a selector, a register and a subtractor. The successive comparator is provided to receive the volume level parameter from the controlling unit 102 and the MAX volume of the audio signal from the register of the MAX volume statistical unit 104, then determine which volume level the MAX volume of the audio signal corresponds to. The encoder encodes the determined volume level into a current index number.

The comparator compares the current index number with a last index number and outputs a selecting signal to the selector. One input of the selector receives the current index number, the other input of the selector is coupled to an output of the subtractor. The last index number is provided into the subtractor, where the last index number is subtracted by one. If the current index number is larger than the last index number, the current index number is selected; otherwise, the last index number is selected. The selected index number is reserved in the register as the index number to be provided to the lookup table.

Figure 4C:
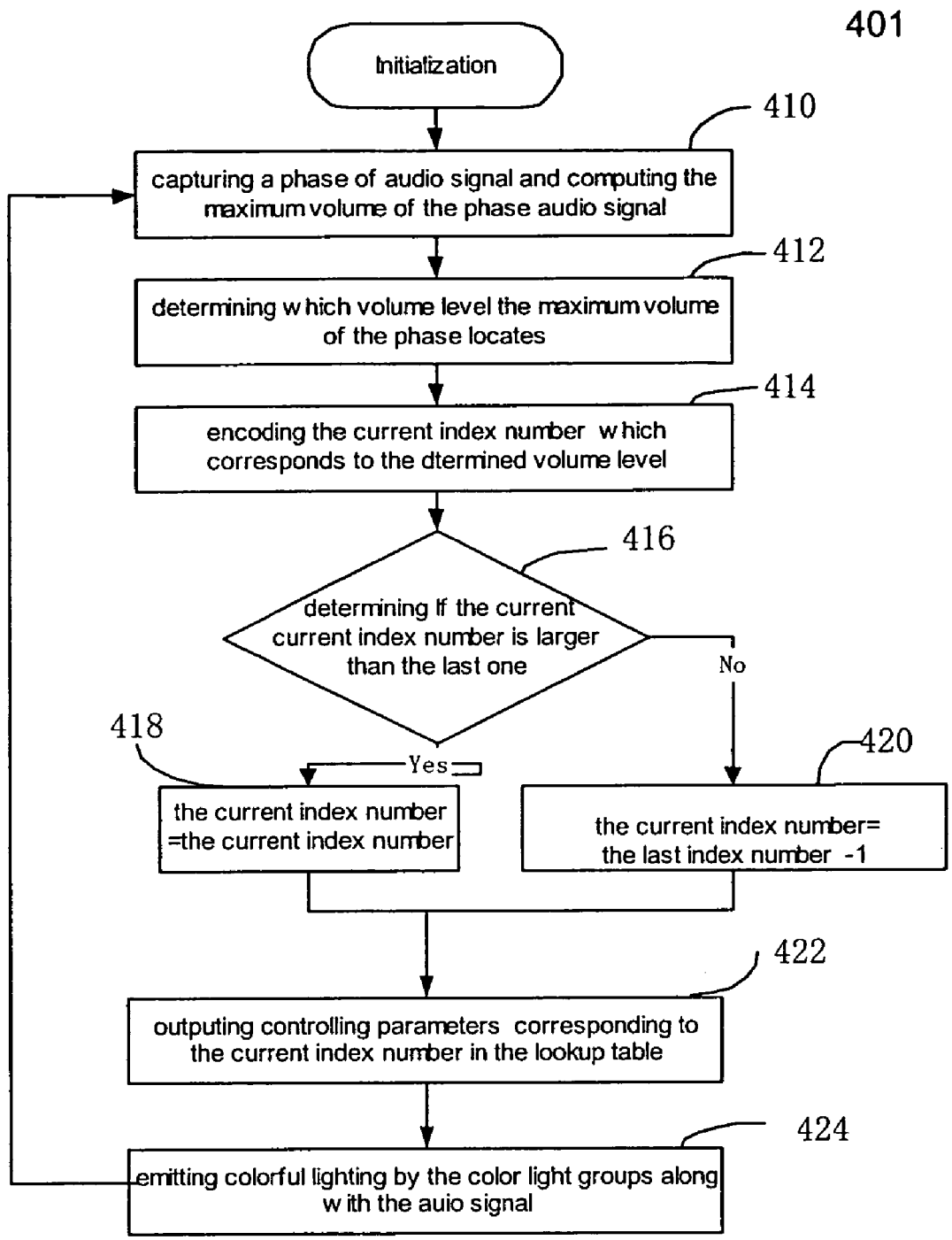
FIG. 4c is a flowchart showing a flowchart or process of producing a set of light controlling parameters to control light sources.

FIG. 4c shows a flowchart or process 401 for controlling illumination in accordance with an audio signal. The process 401 may be implemented in hardware, software or in combination of both as a method, an apparatus or a part of a system. To facilitate the description of the process 401, FIG. 4a and FIG. 4b are referenced.

The process 401 begins with an initialization operation that requires or causes the lookup table 200 to contain light controlling parameters, and the whole volume range is partitioned into several volume levels according to the volume level parameters. Examples of the light controlling parameters include brightness controlling parameters and color controlling parameters according to one embodiment.

At 410, the MAX volume statistical unit 104 captures a phase of an audio signal and computes the MAX volume of the audio signal. The volume level determining unit 106 determines at 412 which volume level the MAX volume of the audio signal corresponds to according to the partitioned volume levels. At 414, the encoder encodes the determined volume level into a current index number. The comparator determines if the current index number is larger than the last one at 416. If the current index number is larger than the last one, the selector selects the current index number to be reserved in the register at 418, otherwise, the last index number subtracted by one is selected as the current index number at 420.

At 422, the lookup table outputs the light controlling parameters corresponding to the current index number to the color light driver 300. As a result, the color light groups produce colorful illumination in synchronization with the audio signal by adjusting the duty cycle according to the light controlling parameters at 424. It should be noted that the comparator, depending on implementation, the selector and the substractor may not be necessary or substituted by other proper elements.

Figure 5A:
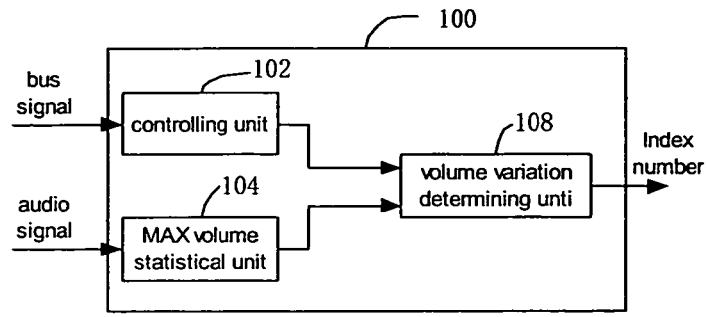
FIG. 5a and FIG. 5b show together another exemplary embodiment of a volume detecting unit.
Figure 5B:
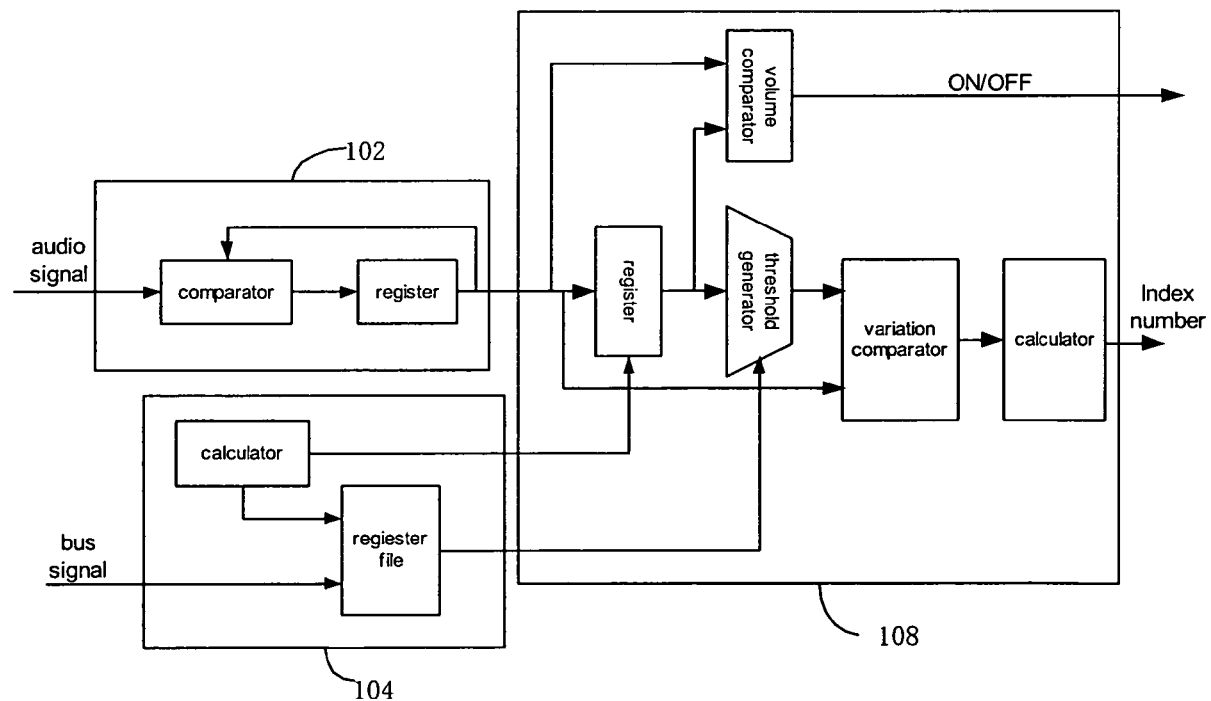

FIG. 5a and FIG. 5b show together a block diagram according to another embodiment of the present invention. The volume detecting unit 100 shown in FIGS. 5a and 5b includes a controlling unit 102, a MAX volume statistical unit 104 and a volume variation determining unit 108. The MAX volume statistical unit 102 includes a comparator that receives a phase of an audio signal and computes the MAX volume of the audio signal and a register the MAX volume of the phase audio signal is to be reserved therein. The controlling unit 104 also includes a calculator that produces a timing clock and a file register to receive configuration parameters from a bus and output a slope threshold of volume variation.

The volume variation determining unit 108 includes a register, a volume threshold generator, a variation comparator, a volume comparator, and a calculator. The register is provided to store the MAX volume of the last phase of the audio signal from the register of the MAX volume statistical unit 102 and couple the MAX volume to an input of the volume comparator. A second input of the volume comparator receives the MAX volume of the current phase of the audio signal. The volume comparator determines if the MAX volume of the current phase of the audio signal is larger than that of the last phase of the audio signal. If yes, which represents that the audio signal rises, light controlling parameters for turning on the color light groups are outputted; otherwise, light controlling parameters for turning off the color light groups are outputted.

The volume threshold generator receives the MAX volume of the last phase and the slope threshold of volume variation, and produces a threshold MAX volume. The variation comparator determines if the MAX volume of the current phase exceeds the threshold MAX volume. If yes, a number in the calculator increases by one as the current index number; otherwise, the number in the calculator keeps unchanged as the current index number.

Figure 5C:
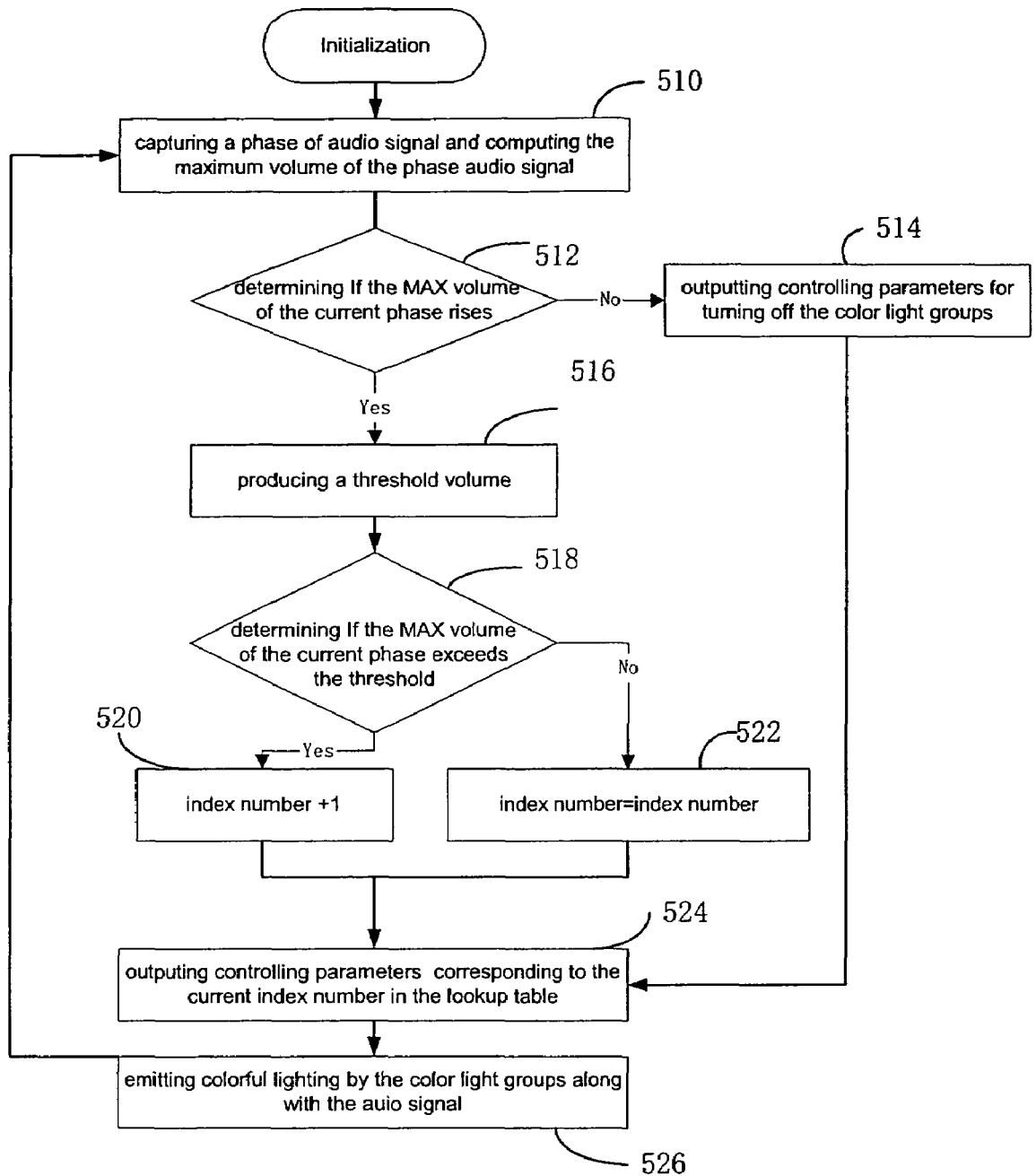
FIG. 5c is a flowchart showing a flowchart or process of producing a set of light controlling parameters to control light sources.

FIG. 5c shows a flowchart or process 501 for controlling illumination in accordance with an audio signal. The process 501 may be implemented in hardware, software or in combination of both as a method, an apparatus or a part of a system. To facilitate the description of the process 501, FIG. 5a and FIG. 5b are referenced.

The process 501 begins with an initialization operation in which the lookup table 200 containing light controlling parameters is established, and the slope threshold in the file register is configured and sent to the volume threshold generator. In one embodiment, the light controlling parameters includes brightness parameters and color parameters.

The process 501 goes to 510, where the MAX volume statistical unit captures a phase of an audio signal and computes the MAX volume of the audio signal. At 512, the volume comparator determines if the MAX volume of the current phase audio signal rises by comparing it with the MAX volume of the last phase of the audio signal. If yes, the process 501 goes to 514 where the light controlling parameters for turning off the color light groups are outputted. If no, the process 501 goes to 516 where the volume threshold generator produces a threshold MAX volume.

At 518, the variation comparator determines if the MAX volume of the current phase exceeds the threshold. If yes, the last index number in the calculator increases by one to work as the current index number at 520; otherwise, the last index number in the calculator remains the same as the current index number at 522.

The lookup table at 524 outputs the controlling parameters, in accordance with the current index number, to the color light group driver. Namely, the square wave generator is configured to adjust the duty cycles of the waves according to the controlling parameters so as to obtain colorful light along with the audio signal (e.g., music). As a result, the color light groups are driven to produce colorful illumination along with the audio signal by adjusting the duty cycle according to the light controlling parameters at 526. It can be understood that the MAX volume statistical unit 104 continuously captures the audio signal as it comes in and the above operations will be repeated until the streaming of the audio is finished.

Figure 6A:
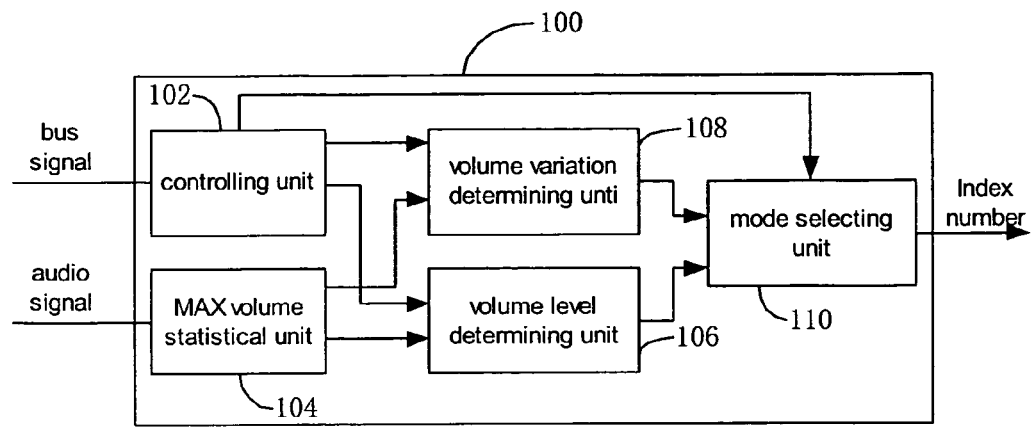
FIG. 6a and FIG. 6b show together an exemplary embodiment of a volume detecting unit.
Figure 6B:
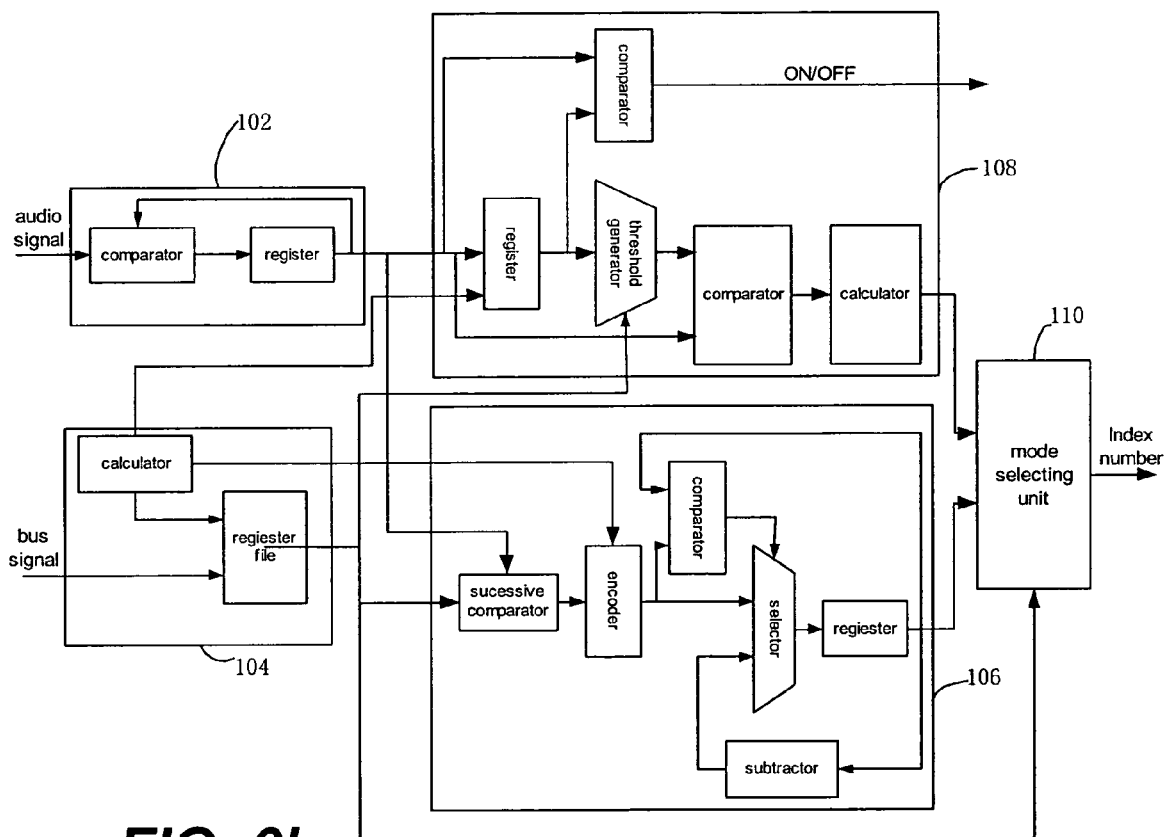

FIG. 6a and FIG. 6b show together a block diagram according to another embodiment of the present invention. The block diagram of the volume detecting unit 100 shown in FIGS. 6a and 6b includes a controlling unit 102, a MAX volume statistical unit 104, a volume level determining unit 106, a volume variation determining unit 108 and a mode selecting unit 110. The controlling unit 102 controls the mode selecting unit 110 to select an output from either the volume level determining unit 106 or the volume variation determining unit 108, where the output is applied to the volume detecting unit 100. When the volume level determining unit 106 is selected, the volume detecting unit 100 of the embodiment is similar to that of the embodiment shown in FIG. 4a and FIG. 4b. When the volume variation determining unit 108 is selected, the volume detecting unit 100 of the embodiment is similar to that of the embodiment shown in FIG. 5a and FIG. 5b. Accordingly, the specific description of the volume detecting unit 100 of the embodiment is not to be provided.

Figure 6C:
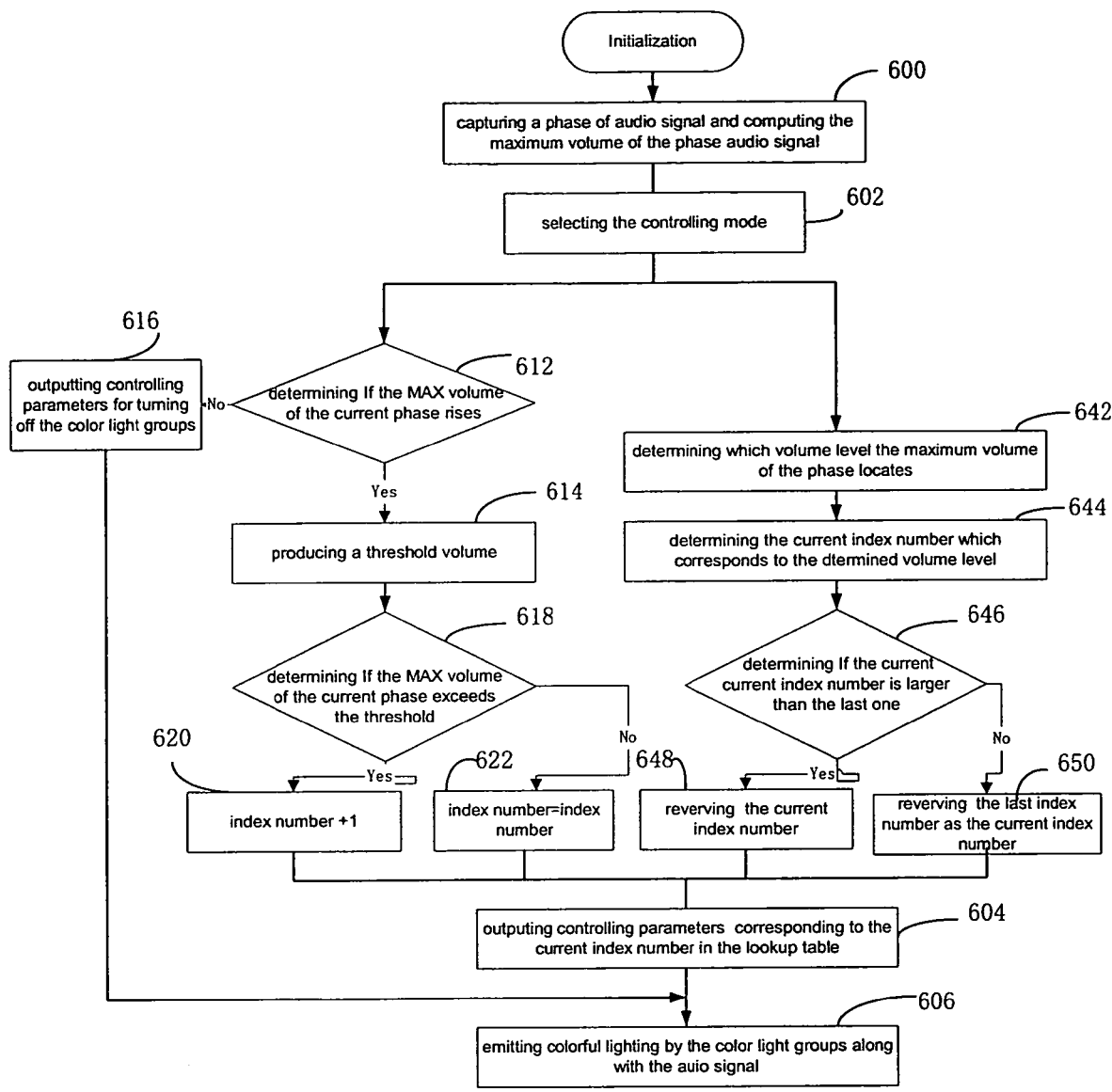
FIG. 6c is a flowchart showing a flowchart or process of producing a set of light controlling parameters to control light sources.

FIG. 6c shows a flowchart or process 601 for controlling illumination in accordance with an audio signal. The process 601 may be implemented in hardware, software or in combination of both as a method, an apparatus or a part of a system. To facilitate the description of the process 501, FIG. 6a and FIG. 6b are referenced. However, as stated above, when the volume level determining unit 106 is selected, the volume detecting unit 100 of the embodiment is similar to that of the embodiment shown in FIG. 4a and FIG. 4b, and when the volume variation determining unit 108 is selected, the volume detecting unit 100 of the embodiment is similar to that of the embodiment shown in FIG. 5a and FIG. 5b. Thus those skilled in the art can readily understand the process 601 given the assumption. As the process 601 is substantially similar to that of FIG. 4c and FIG. 5c, except that a mode selecting operation is now added.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for synchronizing illumination along with an audio signal, the method comprising:
   receiving the audio signal continuously and processing one phase of the audio signal at a time;
   analyzing the one phase of the audio signal to detect a volume of the one phase of the audio signal and variations of the volume so as to produce an index number for the one phase of the audio signal and to determine a set of light controlling parameters according to the index number for the one phase of the audio signal;
   storing the index number of the one phase of the audio signal in a register;
   analyzing another phase of the audio signal to detect a volume thereof and variations of a volume therein so as to produce another index number for the another phase of the audio signal;
   if the another index number is greater than the index number in the register,
      receiving the light controlling parameters from a look-un-table according to the index number already in the register; and
      adjusting, in accordance with the light controlling parameters, duty cycles of square waves used to drive a plurality of light sources such as the illumination produced is in accordance with the another phase of the audio signal,
   if the another index number is not greater than the index number in the register,
      decrementing the index in the register by one to create a revised index number;
      receiving the light controlling parameters from a look-up-table according to the revised index number; and
      adjusting, in accordance with the light controlling parameters, duty cycles of square waves used to drive a plurality of light sources such as the illumination produced is in accordance with the another phase of the audio signal.

2. The method as recited in claim 1, wherein the analyzing of the one phase of the audio signal includes:
   determining weather the one phase of the audio signal is louder that a previous phase of the audio signal;
   if the one phase of the audio signal is louder that the previous phase of the audio signal,
      causing to produce a plurality of light controlling parameters to turn off the light sources;
   if the one phase of the audio signal is not louder that the previous phase of the audio signal,
      comparing a maximum volume in the one phase of the audio signal to a threshold; and
      determining an index number depending on whether the maximum volume is greater than the threshold.

3. The method as recited in claim 2, further comprising:
   If the maximum volume is greater than the threshold,
      setting the index number to be a previously stored index incremented by one,
   If the maximum volume is not greater than the threshold,
      setting the index number to be a previously stored index.

4. The method as recited in claim 1, wherein the light sources include at least three color groups, each illuminating one primary color.

5. The method as recited in claim 1, wherein the light sources represent a display that, illuminates in accordance with the light controlling parameters.

6. A device for synchronizing illumination along with an audio signal, the device comprising:
   an analyzing unit receiving the audio signal continuously and processing one phase of the audio signal at a time, the analyzing unit including a volume detecting unit for analyzing the volume of the phase of the audio signal and variations of the volume, subsequently producing an index number, the analyzing unit configured to determine a set of light controlling parameters according to the index number for the one phase of the audio signal;
   a register for storing the index number so that the analyzing unit is to analyze another phase of the audio signal to detect a volume thereof and variations of the volume so as to produce another index number for the another phase of the audio signal; and
   wherein, if the another index number is greater than the index number in the register, an illumination driver receives the light controlling parameters from a look-up-table according to the index number; and adjusts, in accordance with the light controlling parameters, duty cycles of square waves used to drive a plurality of light sources such that the illumination produced is in accordance with the another phase of the audio signal;
   wherein, if the another index number is not greater than the index number in the register, an illumination driver receives the light controlling parameters from a look-up-table according to the index number decremented by one; and adjusts, in accordance with the light controlling parameters, duty cycles of square waves used to drive a plurality of light sources such that the illumination produced is in accordance with the another phase of the audio signal.

7. The device as recited in claim 6, wherein the analyzing unit includes a volume detecting unit configured to:
   determine weather the one phase of the audio signal is louder that a previous phase of the audio signal;
   if the one phase of the audio signal is louder that the previous phase of the audio signal,
      cause to produce a plurality of light controlling parameters to turn off the light sources;
   if the one phase of the audio signal is not louder that the previous phase of the audio signal,
      compare a maximum volume in the one phase of the audio signal to a threshold; and
      determine an index number depending on whether the maximum volume is greater than the threshold.

8. The device as recited in claim 7, wherein
   If the maximum volume is greater than the threshold, the index number is a previously stored index incremented by one,
   If the maximum volume is not greater than the threshold, the index number is a previously stored index.

9. The device as recited in claim 6, wherein the light sources include at least three color groups, each illuminating one primary color.

10. The method as recited in claim 6, wherein the light sources represent a display that, illuminates in accordance with the light controlling parameters.

* * * * *